(12) United States Patent
Miyake (10) Patent No.: US 7,750,965 B2
(45) Date of Patent: Jul. 6, 2010

(54) IMAGE PICKUP APPARATUS (75) Inventor: Izumi Miyake, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1729 days.

(21) Appl. No.: 10/886,683

(22) Filed: Jul. 9, 2004

(65) Prior Publication Data
US 2005/0007476 A1 Jan. 13, 2005

(30) Foreign Application Priority Data
Jul. 11, 2003 (JP) ............................. 2003-195590

(51) Int. Cl.
*H04N 5/222* (2006.01)
(52) U.S. Cl. ............................. 348/333.01; 348/333.12; 348/333.11; 348/231.2
(58) Field of Classification Search ................................
348/333.01–333.12, 231.2; 396/429; 358/909.1
See application file for complete search history.

(56) References Cited

U.S. PATENT DOCUMENTS

| | | | | |
|---|---|---|---|---|
| 5,625,415 | A * | 4/1997 | Ueno et al. | 348/350 |
| 6,549,307 | B1 * | 4/2003 | Makishima et al. | 386/107 |
| 6,674,467 | B1 * | 1/2004 | Lee | 348/231.2 |
| 6,963,374 | B2 * | 11/2005 | Nakamura et al. | 348/333.11 |
| 7,057,653 | B1 * | 6/2006 | Kubo | 348/273 |
| 7,265,786 | B2 * | 9/2007 | Venturino et al. | 348/333.02 |

FOREIGN PATENT DOCUMENTS

| | | |
|---|---|---|
| EP | 1 075 136 A2 | 2/2001 |
| JP | 10-191119 A | 7/1998 |
| JP | 11177866 A | 7/1999 |
| JP | 2000236460 A | 8/2000 |
| JP | 2000295562 A | 10/2000 |
| JP | 2001-045343 A | 2/2001 |
| JP | 2002330374 A | 11/2002 |
| JP | 2003153173 A | 5/2003 |

OTHER PUBLICATIONS

Nikon D100 camera in Jul., 2002 (http:www.dpreview.com/reviews/nikon100/) by Phil Askey.*

* cited by examiner

*Primary Examiner*—Yogesh K Aggarwal
(74) *Attorney, Agent, or Firm*—Sughrue Mion, PLLC (57) ABSTRACT

An image pickup apparatus comprising:
an image pickup device which takes an image of a subject and generates an image signal;
an operation device in which first operation and second operation are independently acceptable;
a detection device that detects the first operation and second operation of the operation device;
a memory device which loads and stores the image signal from the image pickup device when the first operation of the operation device is detected by the detection device;
a preview image display device which performs predetermined display processing to the image signal stored in the memory device, displays a preview image on a monitor in accordance with the processed image signal, and stops display of the preview image when the first operation or second operation of the operation device is detected by the detection device during display of the preview image; and
an image data recording device which performs predetermined recording processing to the image signal stored in the memory device and records the processed image signal on a recording medium as image data when the second operation of the operation device is detected by the detection device during display of the preview image.

8 Claims, 4 Drawing Sheets

IMAGE PICKUP APPARATUS

BACKGROUND OF THE INVENTION

1. Field of the Invention

The present invention relates to an image pickup apparatus, and in particular, to an image pickup apparatus, which has a monitor in an apparatus body and can replay a taken image, such as a digital camera or a camera cellular phone.

2. Description of the Related Art

Generally, a camera body of a digital camera is provided with a monitor. This monitor is used so as to replay a taken image, and used as a so-called electronic view finder by displaying an image outputted from a CCD in real time during image pickup.

In addition, there are many digital cameras which are made to be able to check a taken image by displaying the taken image for fixed time after image pickup by using this monitor.

For example, Japanese Patent Application Publication No. 2001-45343 proposes a digital camera which displays a taken image on a monitor while a release button is pushed when the release button is continuously pushed after taking an image by pushing the release button.

In addition, Japanese Patent Application Publication No. 10-191119 proposes a digital camera which displays a taken image on a monitor when the image pickup is performed, and switches the image on the monitor to a through image when a release button is halfway pushed.

SUMMARY OF THE INVENTION

Nevertheless, the digital cameras in Japanese Patent Application Publication No. 2001-45343 and Japanese Patent Application Publication No. 10-191119 can only control the display of a taken image. Their operation is troublesome since it is necessary to call an erasing function from a menu etc. separately to erase it when a taken image is not favorable.

On the other hand, there are digital cameras which each display a taken image on a monitor after image pickup, record a taken image on a recording medium when an execution button provided on a camera body is pushed, and erase a taken image when a cancel button is pushed. Nevertheless, they each have a defect that a parts count increases since it is necessary to provide the camera body with the execution button and the cancel button.

The present invention is made in view of such a situation, and aims at providing an image pickup apparatus which can record and perform a print command with few operation members.

In order to achieve the above-described object, a first aspect of the present invention provides an image pickup apparatus comprising an image pickup device which takes an image of a subject and generates an image signal, an operation device in which first operation and second operation are independently acceptable, a detection device that detects the first operation and second operation of the operation device, a memory device which loads and stores the image signal from the image pickup device when the first operation of the operation device is detected by the detection device, a preview image display device which performs predetermined display processing to the image signal stored in the memory device, displays a preview image on a monitor in accordance with the processed image signal, and stops display of the preview image when the first operation or second operation of the operation device is detected by the detection device during display of the preview image, and an image data recording device which performs predetermined recording processing to the image signal stored in the memory device and records the processed image signal on a recording medium as image data when the second operation of the operation device is detected by the detection device during display of the preview image.

According to the first aspect, when the first operation is performed with the operation device, an image signal is displayed on the monitor as a preview image while being loaded from the image pickup device and is stored in the memory device. When the second operation is performed with the operation device while this preview image is displayed, the image signal stored in the memory device is recorded on a recording medium as image data, and the preview image on the monitor is erased. On the other hand, when the first operation is performed with the operation device while this preview image is displayed, recording on a recording medium is cancelled, and the preview image on the monitor is erased. Thus, according to the present invention, the recording of a taken image or the command of cancellation can be performed with one operation device.

In order to achieve the above-described object, a second aspect of the present invention provides an image pickup apparatus comprising an image pickup device which takes an image of a subject and generates an image signal, an operation device in which first operation and second operation are independently acceptable, a detection device that detects the first operation and second operation of the operation device, a memory device which loads and stores the image signal from the image pickup device when the first operation of the operation device is detected by the detection device, a preview image display device which performs predetermined display processing to the image signal stored in the memory device, displays a preview image on a monitor in accordance with the processed image signal, and stops display of the preview image when the first operation or second operation of the operation device is detected by the detection device during display of the preview image, and an image data recording device which performs predetermined recording processing to the image signal stored in the memory device and records the processed image signal on a recording medium as image data when the first operation of the operation device is detected by the detection device during display of the preview image.

According to the second aspect, when the first operation is performed with the operation device, an image signal is displayed on the monitor as a preview image while being loaded from the image pickup device and is stored in the memory device. When the first operation is performed with the operation device while this preview image is displayed, the image signal stored in the memory device is recorded on a recording medium as image data, and the preview image on the monitor is erased. On the other hand, when the second operation is performed with the operation device while this preview image is displayed, recording on a recording medium is cancelled, and the preview image on the monitor is erased. Thus, according to the present invention, it is possible to perform the command of the recording or cancellation of a taken image with one operation device.

In addition, in order to achieve the above-described object, a third aspect of the present invention provides an image pickup apparatus which can replay and display image data recorded on a recording medium on a monitor, comprising an operation device in which first operation and second operation are independently acceptable, a detection device that detects the first operation and second operation of the operation device, a recorded image display device which reads image data from the recording medium on a frame-by-frame basis, performs predetermined display processing to the image data, and sequentially display the processed image data on the monitor a frame-by-frame basis every time the first operation of the operation device is detected by the detection device, and a print information recording device which records information of printing command into the image data of an image displayed on the monitor when the second operation of the operation device is detected by the detection device.

According to the third aspect, image data recorded on the recording medium is read in order by one frame every time the first operation is performed with the operation device, and, is replayed and displayed in order on the monitor. Then, when the second operation is performed with the operation device during this image replay, information on print command is recorded into the image data of the image displayed on the monitor. Thereby, the frame feed and print command of a replayed image can be performed with one operation device.

In order to achieve the above-described object, a fourth aspect of the present invention provides the image pickup apparatus according to the third aspect, comprising an image pickup device which takes an image of a subject and generates an image signal, a release operation device in which first operation and second operation are independently acceptable, a release detection device that detects the first operation and second operation of the operation device, a memory device which loads and stores the image signal from the image pickup device when the first operation of the release operation device is detected by the release detection device, a preview image display device which performs predetermined display processing to the image signal stored in the memory device, displays a preview image on a monitor in accordance with the processed image signal, and stops display of the preview image when the first operation or second operation of the release operation device is detected by the release detection device during display of the preview image, and an image data recording device which performs predetermined recording processing to the image signal stored in the memory device and records the processed image signal on a recording medium as image data when the second operation of the release operation device is detected by the release detection device during display of the preview image.

According to the fourth aspect, when the first operation is performed with the release operation device, an image signal is displayed on the monitor as a preview image while being loaded from the image pickup device and is stored in the memory device. When the second operation is performed with the release operation device while this preview image is displayed, the image data stored in the memory device is recorded on a recording medium by the recording device, and the preview image on the monitor is erased. On the other hand, when the first operation is performed with the operation device while this preview image is displayed, recording on a recording medium is not performed, but the preview image on the monitor is erased. The image data recorded on the recording medium in this manner is read by one frame in order from the recording medium, and is replayed and displayed in order on the monitor every time the first operation is performed with the operation device. Then, when the second operation is performed with the operation device during this image replay, information on print command is recorded into the image data of the image displayed on the monitor.

In order to achieve the above-described object, a fifth aspect of the present invention provides the image pickup apparatus according to the third aspect, comprising an image pickup device which takes an image of a subject and generates an image signal, a release operation device in which first operation and second operation are independently acceptable, a release detection device that detects the first operation and second operation of the operation device, a memory device which loads and stores the image signal from the image pickup device when the first operation of the release operation device is detected by the release detection device, a preview image display device which performs predetermined display processing to the image signal stored in the memory device, displays a preview image on a monitor in accordance with the processed image signal, and stops display of the preview image when the first operation or second operation of the release operation device is detected by the release detection device during display of the preview image, and an image data recording device which performs predetermined recording processing to the image signal stored in the memory device and records the processed image signal on a recording medium as image data when the first operation of the release operation device is detected by the release detection device during display of the preview image.

According to the fifth aspect, when the first operation is performed with the release operation device, an image signal is displayed on the monitor as a preview image while being loaded from the image pickup device and is stored in the memory device. When the first operation is performed with the release operation device while this preview image is displayed, the image signal stored in the memory device is recorded on a recording medium as image data, and the preview image on the monitor is erased. On the other hand, when the second operation is performed with the operation device while this preview image is displayed, recording on a recording medium is not performed, but the preview image on the monitor is erased. The image data recorded on the recording medium in this manner is read by one frame in order from the recording medium, and is replayed and displayed in order on the monitor every time the first operation is performed with the operation device. Then, when the second operation is performed with the operation device during this image replay, information on print command is recorded into the image data of the image displayed on the monitor.

In order to achieve the above-described object, a sixth aspect of the present invention provides the image pickup apparatus according to the fourth aspect, wherein the operation device includes the release operation device.

According to the sixth aspect, the operation device also serves as the release operation device, and hence, recording command and print command can be performed by one operation device.

In order to achieve the above-described object, a seventh aspect of the present invention provides the image pickup apparatus according to the first aspect, comprising a through image display device which continuously loads the image signal from the image pickup device, performs predetermined display processing to the loaded image signal, displays a through image on the monitor in accordance with the processed image signal before the preview image is displayed, or continuously loads the image signal from the image pickup device, performing predetermined display processing to the loaded image signal, and displays a through image on the monitor after the display of the preview image is stopped.

According to the seventh aspect, a through image is displayed on the monitor before image pickup, and when image pickup is performed, a preview image is displayed on the monitor. Then, when the recording or cancellation of a taken image is performed and a preview image is erased, a through image is again displayed on the monitor.

In order to achieve the above-described object, an eighth aspect of the present invention provides the image pickup apparatus according to the first aspect, wherein the operation device or the release operation device is a push button, and the second operation is double push of the push button while the first operation is single push of the push button.

According to the eighth aspect, the operation device comprises a so-called push button. Then, the single push (single click) of the push button is assigned to the first operation, and the double push (double click) is assigned to the second operation.

As explained above, according to the present invention, since the recording command, cancellation, frame feed, a printing order, and the like of taken images can be performed with one operation device, the number of operation members provided in an operation body can be reduced. In addition, the recording command, cancellation, frame feed, a printing order, and the like of taken images can be performed with easy operation.

DETAILED DESCRIPTION OF THE PREFERRED EMBODIMENTS

Preferable embodiments of an image pickup apparatus according to the present invention will be described below in detail according to accompanying drawings.

Figure 1:
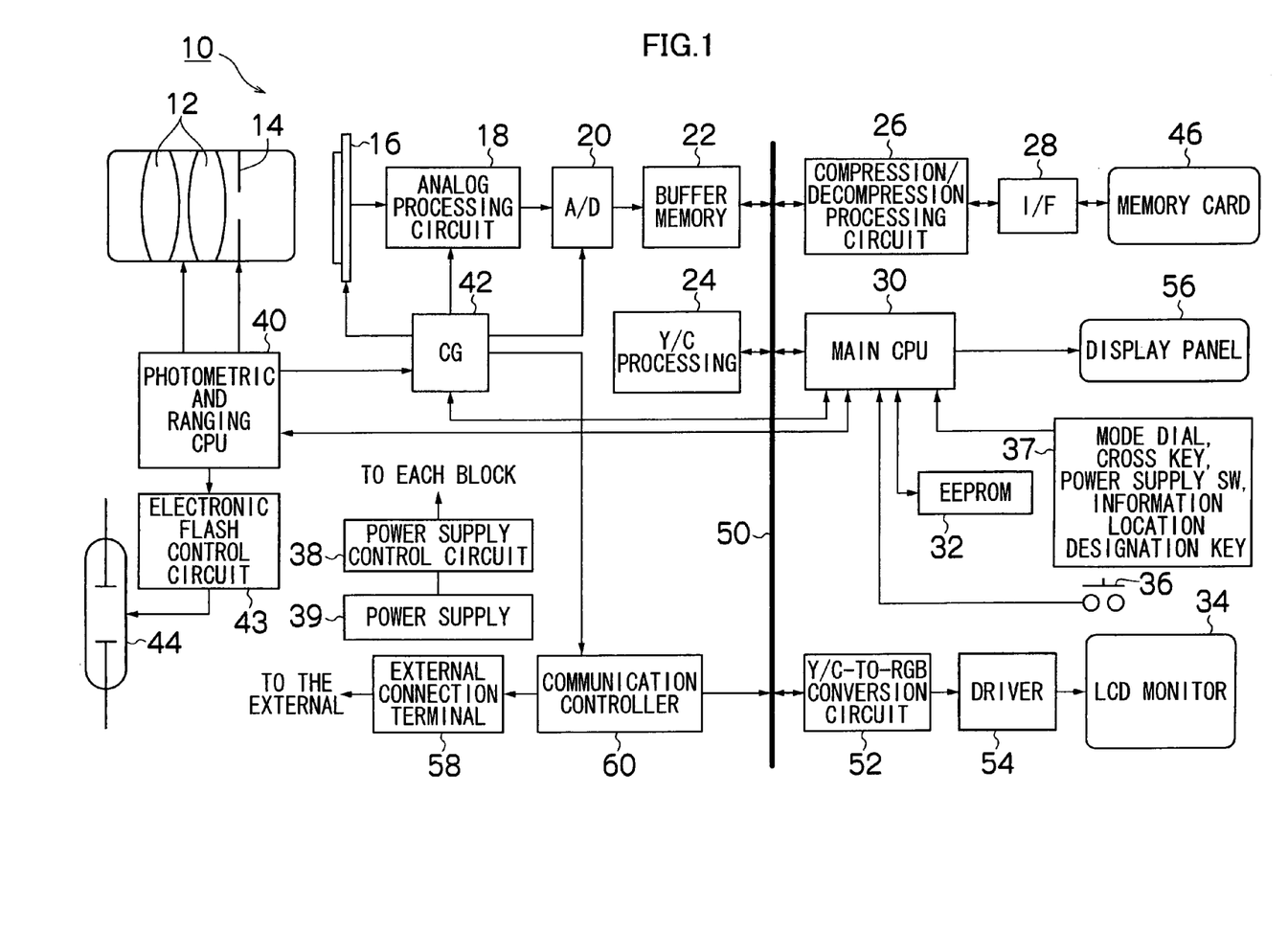
FIG. 1 is a block diagram showing the configuration of a digital camera to which the present invention is applied.

FIG. 1 is a block diagram showing the configuration of a digital camera to which the present invention is applied. This digital camera 10 is a camera which can perform the image pickup and replay of still images, and, as shown in FIG. 1, it comprises an image pickup lens 12, an aperture 14, a CCD image sensor (CCD) 16, an analog processing circuit 18, an A/D converter 20, buffer memory 22, an Y/C processing circuit 24, a compression/decompression processing circuit 26, a card interface 28, a main CPU 30, EEPROM 32, an LCD monitor 34, a release switch 36, an operation unit 37, a Y/C-to-RGB conversion circuit 52, an LCD driver 54, and an display panel 56.

The main CPU 30 is a controller which performs the integrated control of this camera, and controls each circuit on the basis of signal inputs from the release switch 36 and other operation unit 37. The EEPROM 32 stores a control program of this camera, which this main CPU 30 executes, various kinds of parameters and data for control.

The operation unit 37 includes a mode dial, a cross key, a power switch, etc., and the mode dial sets a mode of the camera in an "image pickup mode" or a "replay mode." In addition, the "image pickup mode" is a mode of taking a still image, and the "replay mode" is a mode of replaying a taken still image.

When the power switch of this operation unit 37 is turned ON, a power supply ON signal is outputted to the main CPU 30 from the power switch. The main CPU 30 transmits a command to the power supply control circuit 38 when receiving this power supply ON signal. Then, the power supply control circuit 38 supplies power to each unit of the camera from the power supply (a battery or an external power supply) 39 according to this command.

The release switch 36 comprises a so-called push button. When this release switch 36 is pushed, a S1ON signal is outputted to the main CPU 30. The main CPU 30 detects that the release switch 36 is pushed by receiving this S1ON signal.

In addition, the release switch 36 is made to be able to perform the operation of "double push (double click)", which means to twice push a switch in a short time, besides the operation of normal "single push (single click)" as its operational actions. As described later, a function according to an operation status of the camera is assigned to each action.

Furthermore, the main CPU 30 discriminates between the "single push" and "double push" of the release switch 36 by counting the number of S1ON signals inputted in specified time. That is, the main CPU 30 detects that it is the "single push", when the S1ON signal is once inputted in the specified time. Moreover, the main CPU 30 detects that it is the "double push" when the S1ON signal is twice inputted in the specified time.

Now, under the image pickup mode, the light which passed the image pickup lens 12 is incident on the CCD 16 after light quantity was adjusted by the aperture 14. On a light-receiving surface of the CCD 16, photo sensors are arranged two-dimensionally, and a subject image which is imaged on the light-receiving surface is converted into signal charges with quantity according as incident light quantity by each photo sensor. The signal charges stored in this way are read by turns as a voltage signal (image signal) according to the signal charges on the basis of a clock pulse given from a clock generation circuit 42.

After being applied to the analog processing circuit 18 and being given white balance adjustment, gamma processing, and the like here, the image signal outputted from the CCD 16 is converted into a digital signal by the A/D converter 20, and is once stored in the buffer memory 22.

In addition, the CCD 16, analog processing circuit 18, and A/D converter 20 are synchronized respectively by the clock pulse which is outputted from the clock generation circuit (CG) 42.

The Y/C processing circuit 24 converts the image signal in the buffer memory 22 into a Y/C signal (a luminance signal Y and a chrominance signal C) according to a command from the main CPU 30. This Y/C signal is stored in the buffer memory 22 again.

The Y/C signal stored in the buffer memory 22 is supplied to the Y/C-to-RGB conversion circuit 52 through a bus 50 and is converted into RGB image signals here, and thereafter, they are outputted to the LCD monitor 34 through the LCD driver 54. Thereby, a through image, i.e., an image taken in the CCD 16 in the image pickup mode is displayed on the LCD monitor 34 in real time.

When the "single push" of the release switch 36 is performed in this state, the main CPU 30 detects this, and transmits a command to the photometric and ranging CPU 40. The photometric and ranging CPU 40 performs automatic exposure (AE) control and automatic focusing adjustment (AF) control according to this command, and executes image pickup. That is, the photometric and ranging CPU 40 controls an opening amount of the aperture 14, and the charge storage time of the CCD 16 so that correct exposure is obtained on the basis of photometric result, while controlling the movement of the image pickup lens 12 so as to focus the camera on a major object. Under the present circumstances, when a subject is dark, the electronic flash light control circuit 43 operates on the basis of a command from the photometric and ranging CPU 40, and a electronic flash light flashes. The electronic flash light control circuit 43 controls charging of the main capacitor which is not illustrated, the discharge timing to a xenon tube 44, etc.

Thus, the image signal showing the subject image taken in the CCD 16 is loaded into the buffer memory 22 through the analog processing circuit 18 and A/D converter 20. Then, after predetermined signal processing is performed in the Y/C processing circuit 24, the image signal is stored in the buffer memory 22 as a Y/C signal.

The Y/C signal stored in the buffer memory 22 is supplied to the Y/C-to-RGB conversion circuit 52 and is converted into RGB image signals, and they are outputted to the LCD monitor 34 through the LCD driver 54. Thereby, the image taken in the CCD 16 is displayed on the LCD monitor 34 as a preview image.

When the "double push" of the release switch 36 is performed in the state that this preview image is displayed on the LCD monitor 34, the main CPU 30 detects this and executes the recording processing of the taken image. That is, the main CPU 30 sends a command to the compression/decompression processing circuit 26, and the compression/decompression processing circuit 26 compresses the Y/C signal in the buffer memory 22 in a predetermined form such as JPEG according to this command. The compressed image data is recorded in the memory card 46 through the card interface 28.

Various forms such as a SmartMedia card, an xD picture card, a CompactFlash card, a PC card, a micro drive, an SD memory card, a multimedia card (MMC), a magnetic disk, an optical disk, a magneto-optical disk, and a memory stick are available as forms of the memory card 46 as recording media. A signal processing device and an interface according to a medium used are applied.

On the other hand, when the "single push" of the release switch 36 is performed in the state that this preview image is displayed on the LCD monitor 34, the main CPU 30 detects this and executes the cancellation processing of the record. That is, the preview image displayed on LCD monitor 34 is erased, and a through image is displayed again.

Thus, under the image pickup mode, when an image pickup is performed, a preview image of the taken image is displayed on the LCD monitor 34. When the "double push" of the release switch 36 is performed in the state that this preview image is displayed on the LCD monitor 34, the taken image is recorded on the memory card 46. When the "single push" of the release switch 36 is performed in the state that this preview image is displayed on the LCD monitor 34, the process returns to an image-pickup standby state. That is, the preview image is erased and a through image is again displayed on the LCD monitor 34.

On the other hand, under the replay mode, the replay processing of the image recorded on the memory card 46 is performed as follows.

When the mode dial of the operation unit 37 is set at the replay mode, the main CPU 30 detects this and read the image data, finally recorded on the memory card 46, by one frame. The expansion process of the read image data is performed by the compression/decompression processing circuit 26, and it is outputted to the LCD monitor 34 through the Y/C-to-RGB conversion circuit 52 and LCD driver 54. In this way, the image finally taken is displayed on the LCD monitor 34.

Then, when the "single push" of the release switch 36 is performed, the main CPU 30 detects this and reads the image data of the firstly taken image from the memory card 46. The expansion process of the read image data is performed by the compression/decompression processing circuit 26, and it is outputted to the LCD monitor 34 through the Y/C-to-RGB conversion circuit 52 and LCD driver 54. In this way, the image firstly taken is displayed on the LCD monitor 34.

Then, whenever the "single push" of the release switch 36 is performed, the main CPU 30 reads one frame of the image data from the memory card 46 in order, and performs predetermined display processing to display it on the LCD monitor 34.

That is, under the replay mode, whenever the "single push" of the release switch 36 is performed, the normal frame feed of the images recorded on the memory card 46 is performed.

In addition, when the "double push" of the release switch 36 is performed under this replay mode, the main CPU 30 detects this and executes the processing of a printing order to the image displayed on the LCD monitor 34 at that time.

Figure 2A:
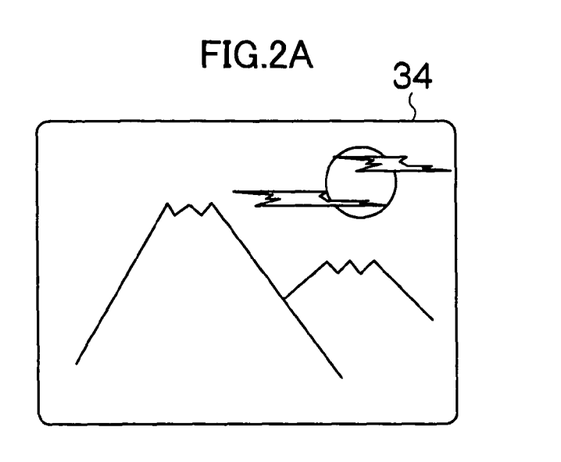
FIGS. 2A to 2C include diagrams showing display examples on an LCD monitor at the time of printing orders.

That is, when the "double push" of the release switch 36 is performed in the state that an image a printing order of which is desired is displayed on the LCD monitor 34 as shown in FIG. 2A, the main CPU 30 shifts the camera mode to a "printing order mode."

Figure 2B:
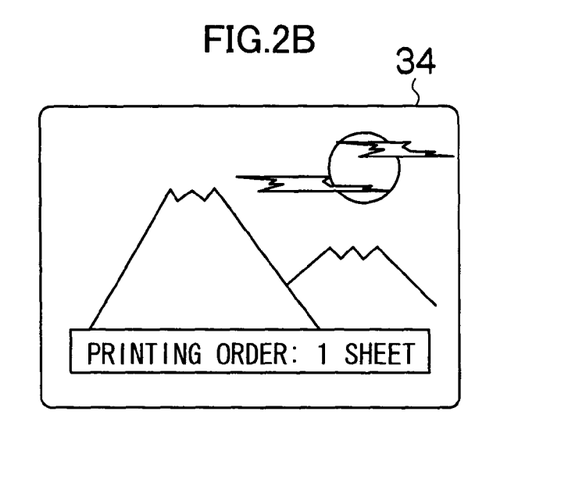
Figure 2C:
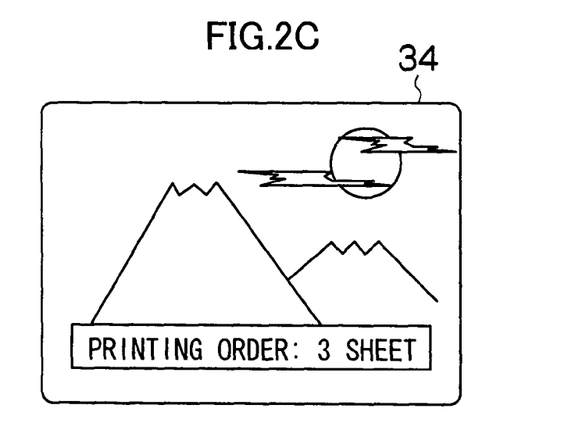

Under this "printing order mode", as shown in FIG. 2B, the number of sheets by the printing order is displayed on the LCD monitor 34 with the ordered image. The number of sheets by a printing order is set at one sheet as an initial value, and whenever the "single push" of the release switch 36 is performed in this state, the number of sheets by a printing order increases by one sheet. FIG. 2C shows the state of the LCD monitor 34 at the time of ordering three sheets by pushing the release switch 36 twice after the mode is shifted to the "printing order mode".

An order command ends up with the "double push" of the release switch 36. The main CPU 30 writes the data of a printing order in image data when detecting the "double push" of the release switch 36. Then, the main CPU 30 returns a camera mode to the "replay mode."

In addition, print information is recorded according to a recording form of the DPOF (Digital Print Order Format) standard, for example. In this DPOF standard, it is possible to record the information relating to the number of sheets to be printed, trimming, and the like, and the information on the presence of the printed, and the like. Furthermore, it is made that the print information of each frame is mentioned in one print information file in a text file form.

Thus, under the "replay mode", it is possible to perform the normal frame feed of a replayed image by the "single push" of the release switch 36, and to process a printing order by the "double push."

In addition, since the digital camera 10 of this embodiment is provided with the external connection terminal (e.g., USB terminal) 58, it is possible to transmit and receive data between with external equipment such as a personal computer by connecting a cable to this external connection terminal 58. The communication controller 60 controls the communication with the external equipment connected to this external connection terminal 58 according to a command from the main CPU 30.

Furthermore, the digital camera 10 of this embodiment is provided with the display panel 56 which simply displays the information relating to a state of the camera, an image pickup mode, and the like in characters, icons, and the like. The display panel 56 displays information such as battery residue, the number of frames which can be taken, a number of the replay frame (file name), a electronic flash light mode, a macro mode, recording image quality, and a pixel count on the basis of a command from the main CPU 30.

Figure 3:
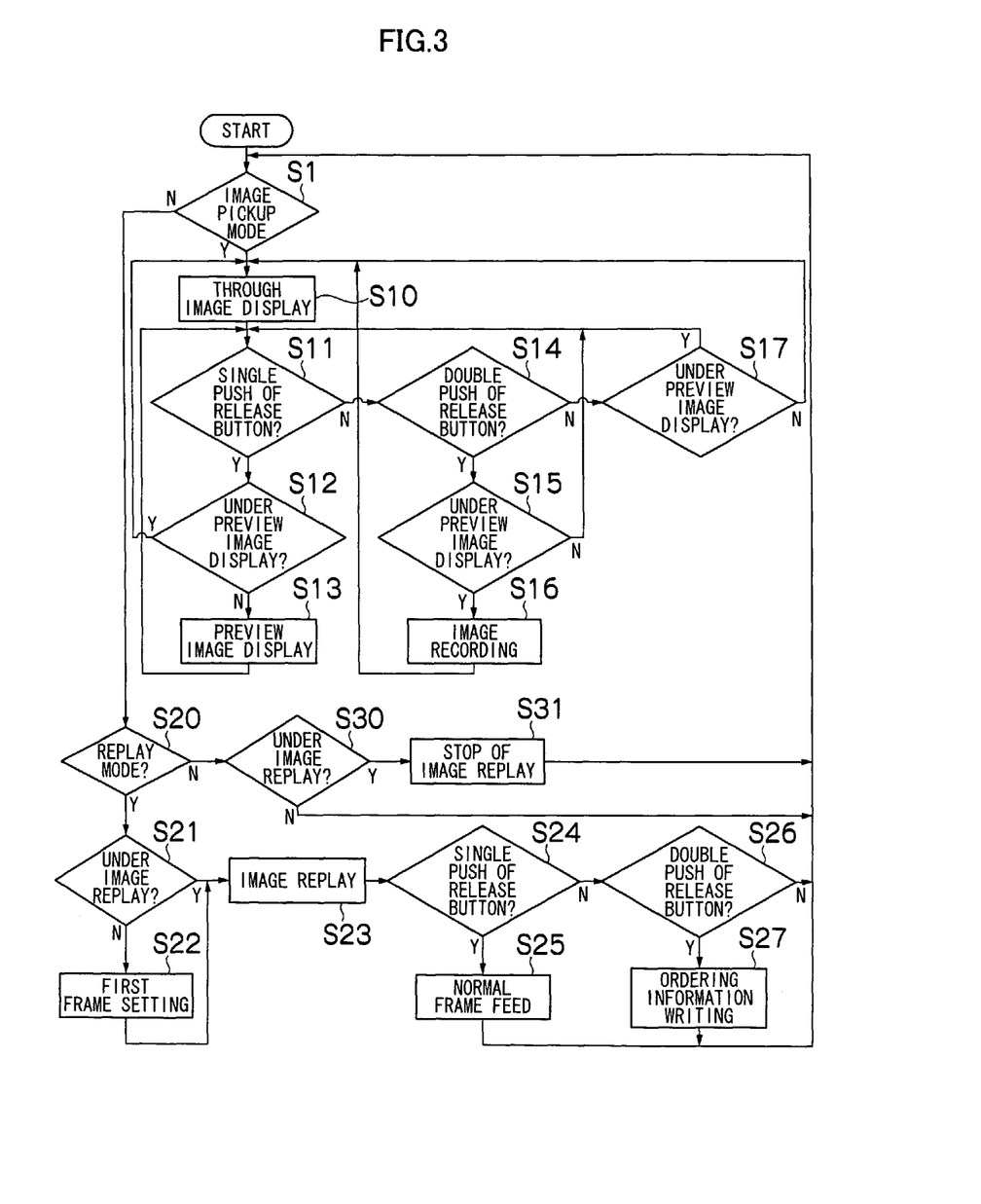
FIG. 3 is a flowchart showing the operation procedure of the digital camera of this embodiment.
Figure 4:
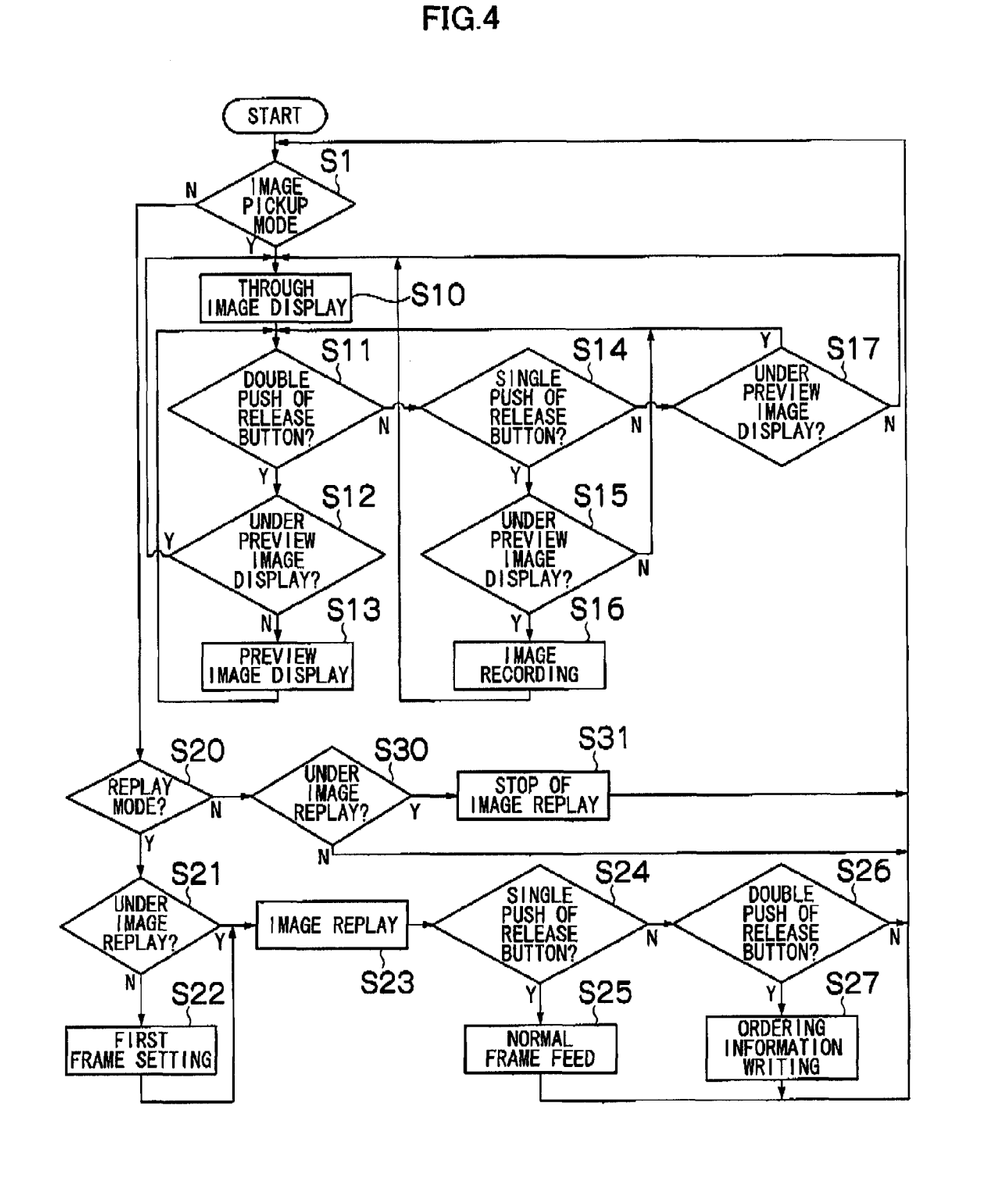
FIG. 4 is a flowchart showing the operation procedure of the digital camera according to an exemplary embodiment of the invention.

Next, the operation of the digital camera 10 of this embodiment constituted as described above will be explained according to the flowchart shown in FIG. 3.

When the power of the camera is turned on, a set mode of the camera is first determined and it is judged whether the set mode of the camera is set at the "image pickup mode" (step S1). As a result, when it is judged that the camera mode is set at the "image pickup mode", the process goes to step 10, but when judged that it is not set at the "image pickup mode", the process goes to step 20.

First, a flow at the time of being judged that the camera mode is set at the "image pickup mode" at step 1 will be explained.

When judged that the camera mode is set at the "image pickup mode", the main CPU 30 makes the state of the camera the image pickup standby state, and displays a through image on the LCD monitor 34 (step S10). A camera person looks at this through image and checks an image pickup angle, a focused state, etc.

The main CPU 30 judges the presence of the "single push" of the release switch 36 under this state (step S11), and determines the existence of a command of image pickup execution. Then, when detecting the "single push" of the release switch 36, the main CPU 30 judges the presence of the display of a preview image (step S12). Then, checking that the preview image is not displayed, the main CPU 30 loads image data and displays the preview image on the LCD monitor 34 (step S13).

A camera person checks the preview image displayed on this LCD monitor 34. The camera person performs "double push" of the release switch 36 when wishing for recording an image on the memory card 46, and when canceling the recording, the camera person performs "single push" of the release switch 36.

That is, when the preview image is displayed, the main CPU 30 first judges the presence of the "single push" of the release switch 36 so as to check the execution and cancellation of recording a taken image (step S11).

Here, when judging that the "single push" of the release switch 36 is performed, the main CPU 30 determines that the execution of recording a taken image is cancelled, and judges the presence of the preview image (step S12) to check the display of the preview image. Then, when the display of the preview image is confirmed, the preview image is erased, and in order to prepare for a next image pickup, the display of the LCD monitor 34 is changed to a through image (step S10).

On the other hand, after the display of the preview image, when judging at step 11 that the "single push" of the release switch 36 is not performed, the main CPU 30 judges the presence of the "double push" next (step S14).

Here, when judging that the "double push" of the release switch 36 is performed, the main CPU 30 determines that the execution of recording a taken image is commanded, and judges the presence of the preview image (step S15) to check the display of the preview image. Then, when the display of the preview image is confirmed, the taken image is recorded on the memory card 46 (step S16). Then, the main CPU 30 erases the preview image displayed on the LCD monitor 34, and in order to prepare for a next image pickup, the main CPU 30 changes the display of the LCD monitor 34 to a through image (step S10).

In addition, when judging at step 14 that the "double push" of the release switch 36 is not performed, the main CPU 30 advances the process to step 17, and judges the presence of a preview image. Here, when the preview image is displayed on the LCD monitor 34, the main CPU 30 determines that the camera is in the state of waiting for an input, advances the process to step 11, and judges the presence of the "single push" of the release switch 36 again.

On the other hand, when judging at step 17 that the preview image is not displayed, the main CPU 30 determines that the command of execution of image pickup is not inputted yet. The main CPU 30 advances the process to step 10, and displays a through image on the LCD monitor 34 succeedingly to wait for inputting the command of execution of image pickup.

In addition, when judging at step 15 that the preview image is not displayed on the LCD monitor 34 after judging at step 14 that the "double push" of the release switch 36 is performed, the main CPU 30 advances the process to step 11, and judges the presence of the "single push" of the release switch 36 again. This is a flow at the time of the "double push" of the release switch 36 being performed during the display of a through image. Hence, when the "double push" of the release switch 36 is performed during the display of a through image, the main CPU 30 disregards the operation and waits for the command of execution of image pickup being inputted correctly.

Next, a flow at the time of being judged at step 1 that the camera mode is not set at the "image pickup mode" will be explained.

When judging at step 1 that the camera mode is not set at the "image pickup mode", the main CPU 30 advances the process to step 20, and judges whether it is set at the "replay mode".

Here, the main CPU 30 next judges whether the taken image is replayed on the LCD monitor 34 (step S21) after judging that the camera mode is set at the "replay mode". When it is not under replay, the setting of a first frame is performed (step S22). That is, the image of the frame finally recorded on the memory card 46 is set, and the image concerned is replayed on the LCD monitor 34 (step S23).

The main CPU 30 judges the presence of the "single push" of the release switch 36 after image replay (step S24). When judging that the "single push" of the release switch 36 is performed, the main CPU 30 performs normal frame feed (step S25). That is, the display on the LCD monitor 34 is changed and a next image is displayed on the LCD monitor 34.

When performing the normal frame feed of the replayed image, the main CPU 30 advances the process to step 1 and checks the set mode of the camera. Then, when confirming that it is not set at the "image pickup mode", the main CPU 30 judges whether it is set at the "replay mode" (step S20). When judging that the mode is set at the "replay mode", the main CPU 30 judges whether the taken image is replayed on the LCD monitor 34 (step S21). In the case that the image is replayed, the main CPU 30 continues the image replay (step S23), and waits for an input from the release switch 36.

When judging at step 24 that the "single push" of the release switch 36 is not performed, the main CPU 30 judges the presence of the "double push" of the release switch 36 next (step S26). Here, when judging that the "double push" of the release switch 36 is performed, the main CPU 30 executes the processing of a printing order (step S27).

When executing the processing of the print order, the main CPU 30 advances the process to step 1 again and checks the set mode of the camera. Then, when confirming that it is not set at the "image pickup mode", the main CPU 30 judges whether it is set at the "replay mode" (step S20). When judging that the mode is set at the "replay mode", the main CPU 30 judges whether the taken image is replayed on the LCD monitor 34 (step S21). In the case that the image is replayed, the main CPU 30 continues the image replay (step S23), and waits for an input from the release switch 36.

When judging at step 24 that the "single push" of the release switch 36 is not performed, the main CPU 30 judges the presence of the "double push" of the release switch 36 next (step S26). Here, when judging that the "double push" of the release switch 36 is performed, the main CPU 30 executes the processing of a printing order (step S27).

In addition, when judging at step 26 that the "double push" of the release switch 36 is not performed, the main CPU 30 determines that a command of normal frame feed or a command of a printing order is not issued yet, and advances the process to step 1. Then, the main CPU 30 waits for an input of the command from the release switch 36.

Furthermore, when judging at step 20 that the camera mode is not set at the "replay mode", the main CPU 30 judges the presence of image replay (step S30). When judging that replay is performed, the main CPU 30 advances the process to step 1 after stopping the image replay (step S31), and judges the set mode of the camera.

As explained above, under the image pickup mode, image pickup is performed by the "single push" of a release switch 36, and when the image pickup is performed, the preview image of the taken image is displayed on the LCD monitor 34. A camera person checks the preview image displayed on this LCD monitor 34, and when wishing for recording the image on the memory card 46, he/she performs the "double push" of the release switch 36. Thereby, the taken image is recorded on the memory card 46. On the other hand, when looking at the preview image and determining that recording is needless, he/she performs the "single push" of the release switch 36. Thereby, the recording of the taken image on the memory card 46 is canceled. After the execution or cancellation of recording of the taken image on the LCD monitor 34, the main CPU 30 displays a through image again, and waits for next image pickup.

On the other hand, under the "replay mode", it is possible to perform the normal frame feed of a replayed image by the "single push" of the release switch 36, and to process a printing order by the "double push."

Thus, according to the digital camera 10 of this embodiment, it is possible to command the execution or cancellation of recording of the taken image, the frame feed of replayed images, and a printing order by pushing operation of the release switch 36. Thereby, it becomes unnecessary to separately provide operating members, used for commanding the execution and cancellation of recording a taken image, the frame feed of replayed images, and a printing order, in a camera body. Hence, it is possible to reduce the number of the operation members provided in the camera body.

In addition, since it is made that these operation commands are given by the "single push" and "double push" of the push button type release switch 36, operation becomes simple and operability improves.

Furthermore, the digital camera 10 of this embodiment is configured so that, in the "replay mode", normal frame feed may be executed when the "single push" of the release switch 36 is performed, and the processing of a printing order may be executed when the "double push" is performed. Nevertheless, it is also acceptable to execute the functions concerned with other buttons. For example, by assigning the functions to a right button of the cross key, the normal frame feed may be executed when the "single push" of the right button of the cross key is performed, and the processing of a printing order may be executed when the "double push" is performed. In this case, reverse frame feed may be executed when the "single push" of a left button of the cross key is performed, and the processing of a printing order may be executed when the "double push" is performed. In addition, the recording of a taken image may be executed when the "single push" of the right button of the cross key is performed in the state of a preview image being displayed, for example, after the execution of image pickup, and the recording of a taken image may be canceled when the "double push" of the right button is performed.

Furthermore, usually, a release switch 36 is usually located in the location which a forefinger touches naturally when a camera person grips a camera body. Hence, operability improves by adopting such configuration that various operation commands may be given by the "single push" and "double push" of this release switch 36.

In addition, in the digital camera 10 of this embodiment, two kinds of operational actions of the "single push (single click)" and "double push (double click)" of the release switch 36 are given to one release button 36. Nevertheless, the operational actions are not limited to these. Operational actions may be judged according to the pushing time of a push button. For example, the "first operation" may be given if the push button is pushed for less than two seconds and the "second operation" may be given if the push button is pushed for two seconds or more. In addition, with a two-step type push button having a "halfway push" step and a "full push" step, the "first operation" may be given by the "halfway push", and the "second operation" may be given by the "full push." Furthermore, with a seesaw button rocking in the vertical or horizontal direction, the "first operation" may be given by an "upward push (or a leftward push)", and the "second operation" may be given by a "downward push (or a rightward push)."

In addition, the digital camera 10 of this embodiment may be configured so that the recording of a taken image is executed when the "double push" of the release switch 36 is performed in the state that a preview image is displayed under the image pickup mode and the recording of a taken image is canceled when the "single push" is performed, and vice versa. The recording of a taken image may be executed when the "single push" of the release switch 36 is performed, and the recording of a taken image may be canceled when the "double push" is performed.

Normal frame feed may be performed when the "single push" of the release switch 36 is performed under the "replay mode", and the processing of a printing order may be executed when the "double push" is performed. Normal frame feed may also be performed when the "double push" of the release switch 36 is performed, and the processing of a printing order may be executed when the "single push" is performed.

Furthermore, it is also acceptable to assign another function of not executing the processing of a printing order, as a function at the time of the "double push". For example, it is also acceptable to perform reverse frame feed when the "double push" is performed, or to display a menu screen.

In addition, the digital camera 10 of this embodiment uses the function of the "single push" and "double push" of the release button 36 in both modes of the "image pickup mode" and "replay mode". The function concerned may also be used in only one of the "image pickup mode" and "replay mode." That is, the function of the "single push" and "double push" of the release button 36 may be enabled only in the "image pickup mode", or the function of the "single push" and "double push" of the release button 36 may be enabled only in the "replay mode".

Furthermore, the digital camera 10 of this embodiment makes the LCD monitor 34 display a through image before the execution of image pickup under the "image pickup mode". Nevertheless, in a digital camera equipped with an optical finder, it is preferable that a camera person can arbitrarily set the display of a through image. In addition, when taking an image without displaying a through image, the LCD monitor 34 is made to display a preview image after image pickup is executed, and the preview image is erased from the LCD monitor 34 after the processing of execution or cancellation of recording. Thereby, it is possible to save electricity.

It is to be understood that the present invention is not limited to the above-described embodiment. The present invention is applicable to a digital camera, and applicable similarly to electronic equipment comprising an image pickup function such as a cellular phone with a camera or a PDA with a camera.

What is claimed is:

1. An image pickup apparatus comprising:
   an image pickup device which takes an image of a subject and generates an image signal;
   an operation device in which first operation and second operation are independently acceptable;
   a detection device that detects the first operation and second operation of the operation device;
   a memory device which loads and stores the image signal from the image pickup device when the first operation of the operation device is detected by the detection device;
   a preview image display device which performs predetermined display processing to the image signal stored in the memory device and displays a preview image on a monitor in accordance with the processed image signal;
   a first device which stops display of the preview image, and which performs predetermined recording processing to the image signal stored in the memory device and records the processed image signal on a recording medium as image data when the first operation of the operation device is detected by the detection device during display of the preview image; and
   a second device which stops displa of the preview image when the second operation of the operation device is detected by the detection device during display of the preview image,
   wherein the operation device is a release button, and the first operation is a single push of the release button and the second operation is a double push of the release button.

2. The image pickup apparatus according to claim 1, comprising a through image display device which continuously loads the image signal from the image pickup device, performs predetermined display processing to the loaded image signal, displays a through image on the monitor in accordance with the processed image signal before the preview image is displayed, or continuously loads the image signal from the image pickup device, performing predetermined display processing to the loaded image signal, and displays a through image on the monitor after the display of the preview image is stopped.

3. The image pickup apparatus according to claim 1, wherein the second operation includes cancellation of recording.

4. An image pickup apparatus which can replay and display image data recorded on a recording medium on a monitor, comprising:
   an operation device in which first operation and second operation are independently acceptable;
   a detection device that detects the first operation and second operation of the operation device;
   a recorded image display device which reads image data from the recording medium on a frame-by-frame basis, performs predetermined display processing to the image data, and sequentially displays the processed image data on the monitor a frame-by-frame basis every time the first operation of the operation device is detected by the detection device;
   a print information recording device which records information of printing command into the image data of an image displayed on the monitor when the second operation of the operation device is detected by the detection device;
   an image pickup device which takes an image of a subject and generates an image signal;
   a release operation device in which first operation and second operation are independently acceptable;
   a release detection device that detects the first operation and second operation of the operation device;
   a memory device which loads and stores the image signal from the image pickup device when the first operation of the release operation device is detected by the release detection device;
   a preview image display device which performs predetermined display processing to the image signal stored in the memory device, displays a preview image on a monitor in accordance with the processed image signal, and stops display of the preview image when the first operation or second operation of the release operation device is detected by the release detection device during display of the preview image; and
   an image data recording device which performs predetermined recording processing to the image signal stored in the memory device and records the processed image signal on a recording medium as image data when the first operation of the release operation device is detected by the release detection device during display of the preview image.

5. The image pickup apparatus according to claim 4, wherein the release operation is a push button, and the second operation is double push of the push button while the first operation is single push of the push button.

6. The image pickup apparatus according to claim 4, comprising a through image display device which continuously loads the image signal from the image pickup device, performs predetermined display processing to the loaded image signal, displays a through image on the monitor in accordance with the processed image signal before the preview image is displayed, or continuously loads the image signal from the image pickup device, performing predetermined display processing to the loaded image signal, and displays a through image on the monitor after the display of the preview image is stopped.

7. An image pickup apparatus which can replay and display image data recorded on a recording medium on a monitor, comprising:
   an operation device in which first operation and second operation are independently acceptable;
   a detection device that detects the first operation and second operation of the operation device;
   a recorded image display device which reads image data from the recording medium on a frame-by-frame basis, performs predetermined display processing to the image data, and sequentially display the processed image data on the monitor a frame-by-frame basis every time the first operation of the operation device is detected by the detection device;
   a print information recording device which records information of printing command into the image data of an image displayed on the monitor when the second operation of the operation device is detected by the detection device;

an image pickup device which takes an image of a subject and generates an image signal;

a release operation device in which first operation and second operation are independently acceptable;

a release detection device that detects the first operation and second operation of the operation device;

a memory device which loads and stores the image signal from the image pickup device when the first operation of the release operation device is detected by the release detection device;

a preview image display device which performs predetermined display processing to the image signal stored in the memory device, displays a preview image on a monitor in accordance with the processed image signal, and stops display of the preview image when the first operation or second operation of the release operation device is detected by the release detection device during display of the preview image; and an image data recording device which performs predetermined recording processing to the image signal stored in the memory device and records the processed image signal on a recording medium as image data when the second operation of the release operation device is detected by the release detection device during display of the preview image, wherein the operation device includes the release operation device.

8. The image pickup apparatus according to claim 7, comprising a through image display device which continuously loads the image signal from the image pickup device, performs predetermined display processing to the loaded image signal, displays a through image on the monitor in accordance with the processed image signal before the preview image is displayed, or continuously loads the image signal from the image pickup device, performing predetermined display processing to the loaded image signal, and displays a through image on the monitor after the display of the preview image is stopped.

* * * * *